US012666345B2

(12) United States Patent
Gurumoorthy et al.

(10) Patent No.: US 12,666,345 B2
(45) Date of Patent: Jun. 23, 2026

(54) SYSTEM INFORMATION BLOCK SEGMENTATION

(71) Applicant: Apple Inc., Cupertino, CA (US)

(72) Inventors: Sethuraman Gurumoorthy, San Ramon, CA (US); Dawei Zhang, Saratoga, CA (US); Fangli Xu, Beijing (CN); Haijing Hu, Los Gatos, CA (US); Naveen Kumar R. Palle Venkata, San Diego, CA (US); Ralf Rossbach, Munich (DE); Sarma V. Vangala, Campbell, CA (US); Sigen Ye, San Diego, CA (US); Srirang A. Lovlekar, Fremont, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 268 days.

(21) Appl. No.: 17/754,041

(22) PCT Filed: Apr. 1, 2021

(86) PCT No.: PCT/CN2021/085151
§ 371 (c)(1),
(2) Date: Mar. 22, 2022

(87) PCT Pub. No.: WO2022/205393
PCT Pub. Date: Oct. 6, 2022

(65) Prior Publication Data
US 2024/0049113 A1 Feb. 8, 2024

(51) Int. Cl.
*H04W 48/08* (2009.01)
*H04L 5/00* (2006.01)

(52) U.S. Cl.
CPC ........... *H04W 48/08* (2013.01); *H04L 5/0051* (2013.01)

(58) Field of Classification Search
CPC ............................. H04W 48/08; H04L 5/0051
(Continued)

(56) References Cited

U.S. PATENT DOCUMENTS

| | | | |
|---|---|---|---|
| 11,395,247 B2 * | 7/2022 | Shih ..................... | H04W 56/001 |
| 11,671,901 B2 * | 6/2023 | Tseng .................... | H04W 48/12 |
| | | | 455/434 |

(Continued)

FOREIGN PATENT DOCUMENTS

| | | |
|---|---|---|
| CN | 101252787 | 8/2008 |
| CN | 110140381 | 8/2019 |

(Continued)

OTHER PUBLICATIONS

"Bao, Method and Device for Sending and Receiving System Information, Dec. 1, 2010, CN 101902800" (Year: 2009).*
(Continued)

*Primary Examiner* — Joseph E Avellino
(74) *Attorney, Agent, or Firm* — Fay Kaplun & Marcin, LLP

(57) ABSTRACT

A user equipment (UE) is configured to decode a system information block (SIB). The UE receives a first signal, wherein the first signal includes a first individual system information block (SIB) segment of a SIB, receives a second signal, wherein the second signal includes a second individual SIB segment of the SIB, reassembles the SIB using first SIB segment and the second SIB segment and decodes the contents of the SIB.

15 Claims, 10 Drawing Sheets

(58) Field of Classification Search
USPC ........................................................ 370/329
See application file for complete search history.

(56) References Cited

U.S. PATENT DOCUMENTS

| | | | | |
|---|---|---|---|---|
| 12,207,321 | B2 * | 1/2025 | Freda .................... | H04W 76/27 |
| 2009/0316603 | A1 | 12/2009 | Amerga et al. | |
| 2011/0117912 | A1 | 5/2011 | Mahajan et al. | |
| 2011/0320856 | A1 | 12/2011 | Deivasigamani et al. | |
| 2014/0293908 | A1 | 10/2014 | Kumar et al. | |
| 2017/0353974 | A1 * | 12/2017 | Rupanagudi Venkata ................... H04W 68/025 | |
| 2018/0167946 | A1 * | 6/2018 | Si .............................. | H04L 5/00 |
| 2018/0270115 | A1 | 9/2018 | Mallick et al. | |
| 2018/0324740 | A1 * | 11/2018 | Edge ..................... | H04W 64/00 |
| 2019/0342824 | A1 * | 11/2019 | Futaki ................... | H04W 72/04 |
| 2020/0053690 | A1 | 2/2020 | Fischer et al. | |
| 2021/0105852 | A1 * | 4/2021 | Shih ...................... | H04W 76/10 |
| 2021/0385618 | A1 * | 12/2021 | Modarres Razavi ........................ G01S 5/0236 | |
| 2022/0394526 | A1 * | 12/2022 | Wang .................. | H04W 72/542 |
| 2023/0328689 | A1 * | 10/2023 | Ozturk .................. | H04W 76/14 455/458 |
| 2024/0129095 | A1 * | 4/2024 | Li ......................... | H04L 5/0053 |
| 2024/0155470 | A1 * | 5/2024 | Orsino ................. | H04W 48/10 |

FOREIGN PATENT DOCUMENTS

| | | |
|---|---|---|
| CN | 110622587 | 12/2019 |
| CN | 112400332 | 2/2021 |
| CN | 112567864 | 3/2021 |
| WO | 2009/001288 A2 | 12/2008 |
| WO | 2017/011802 A1 | 1/2017 |
| WO | 2019/032230 A1 | 2/2019 |
| WO | WO-2021205415 A1 * | 10/2021 ............. H04L 5/005 |

OTHER PUBLICATIONS

"Ma et al., Partial Allocation of Bandwidth in Wireless Communication Systems, Sep. 22, 2022, KR 20220128996" (Year: 2021).*

"Brismar et al., Extended System Information Distribution Mechanisms, Aug. 28, 2014, WO 2014129951" (Year: 2014).*

"Jiang et al., A Method and Device for Continuously Transmitting New Packet, Dec. 1, 2010, CN 101902782" (Year: 2009).*

OPPO, "Open issues on system information", 3GPP TSG-RAN WG2 Meeting #109, R2-2000199, Feb. 28, 2020, 8 sheets.

Huawei et al., "Considerations on System Information scheduling", 3GPP TSG-RAN WG2 Meeting #99bis, R2-1710488, Oct. 13, 2017, 4 sheets.

Qualcomm Incorporated, "Further Details on Broadcast of Assistance Data", 3GPP TSG-RAN WG2 Meeting #101, R2-1803394, Feb. 16, 2018, 11 sheets.

Qualcomm Incorporated, "Broadcast of Positioning Assistance Data", 3GPP TSG-RAN WG2 Meeting #99b, R2-1711042, Sep. 29, 2017, 7 sheets.

Samsung Electronics. "Corrections to discarding segments of SIB 12", 3GPP TSG-RAN2 Meeting # 111 Electronic, R2-2007074, Aug. 7, 2020, 3 sheets.

Samsung Electronics, "Corrections to discarding segments of SIB 28", 3GPP TSG-RAN WG2 Meeting #111 Electronic, R2-2007075, Aug. 7, 2020, 2 sheets.

* cited by examiner

Method 400

405 — UE camps on gNB in an RRC idle/inactive state

410 — gNB generates a SIBX that is to be transmitted to one or more UEs

415 — gNB transmits each individual SIB segment

420 — UE decodes the contents of one or more SIB segments

```
SIB-TypeInfo ::= SEQUENCE { type      ENUMERATED {SIBType-X} valueTag    INTEGER (0...31)

areaScope   ENUMERATED {TRUE} modifiedSegInd   INTEGER (0......65535)

}
```

ASN.1 500

Fig. 5

Method 600

605  UE camps on gNB in RRC idle/inactive state 610  gNB generates a SIBX that is to be transmitted to one or more UEs 615  gNB transmits each individual SIB segment 620  UE assembles multiple SIB segments 625  UE decodes the content of the SIBX using the complete set of SIB segments Start End Container 700

```
SI Segment : = SEQUENCE {
    messageSegmentType      ENUMERATED {notLastSegment, LastSegment},
    messageSegmentNumber  INTEGER (0,…,N-1),
    messageSegmentContainer  OCTET STRING,
    laterNonCriticalExtension

…

}
```

SYSTEM INFORMATION BLOCK SEGMENTATION

BACKGROUND

A base station may broadcast a system information block (SIB). There are various different types of SIBs and each type of SIB may contain a particular type of information. For example, SIB1 may contain cell access information and scheduling information for the other SIBs. To provide another example, SIB2 may contain system information that may be used for cell reselection. SIB1 and SIB2 are just two examples of the multiple different types of SIBs defined throughout third generation partnership (3GPP) Specifications.

A SIB may contain a wide array of different types of information. However, for any of a variety of different reasons, a SIB may be subject to a maximum size limit. The SIB maximum size limit may prevent SIBs from being utilized to provide certain types of information.

SUMMARY

Some exemplary embodiments are related to a processor of a user equipment (UE) configured to perform operations. The operations include receiving a first signal, wherein the first signal includes a first individual system information block (SIB) segment of a SIB, receiving a second signal, wherein the second signal includes a second individual SIB segment of the SIB, reassembling the SIB using first SIB segment and the second SIB segment and decoding the contents of the SIB.

Other exemplary embodiments are related to a processor of a base station configured to perform operations. The operations include encoding an unsegmented complete system information block (SIB) that is to be transmitted to one or more user equipment (UE), partitioning the unsegmented complete SIB into multiple individual SIB segments, transmitting a first signal, wherein the first signal includes a first individual SIB segment and transmitting a second signal, wherein the second signal includes s second individual SIB segment and wherein the one or more UE is to reassemble the SIB segments prior to decoding the contents of the SIB.

Still further exemplary embodiments are related to a processor of a user equipment (UE) configured to perform operations. The operations include receiving a first signal, wherein the first signal includes a first individual system information block (SIB) segment of a SIB, receiving a second signal, wherein the second signal includes a second individual SIB segment of the SIB, receiving an indication that one or more of the SIB segments have been modified and transmitting an on demand system information request in response to the indication.

Additional exemplary embodiments are related to a processor of a base station configured to perform operations. The operations include transmitting a first signal, wherein the first signal includes a first individual system information block (SIB) segment of a SIB, transmitting a second signal, wherein the second signal includes a second individual SIB segment of the SIB, transmitting an indication that the SIB has been modified and receiving an on demand system information request from a user equipment (UE) in response to the indication.

BRIEF DESCRIPTION OF THE DRAWINGS

FIG. 5 shows an example of an abstract syntax notation one (ASN.1) that may be utilized to indicate a modified SIB segment.

DETAILED DESCRIPTION

Figure 1:
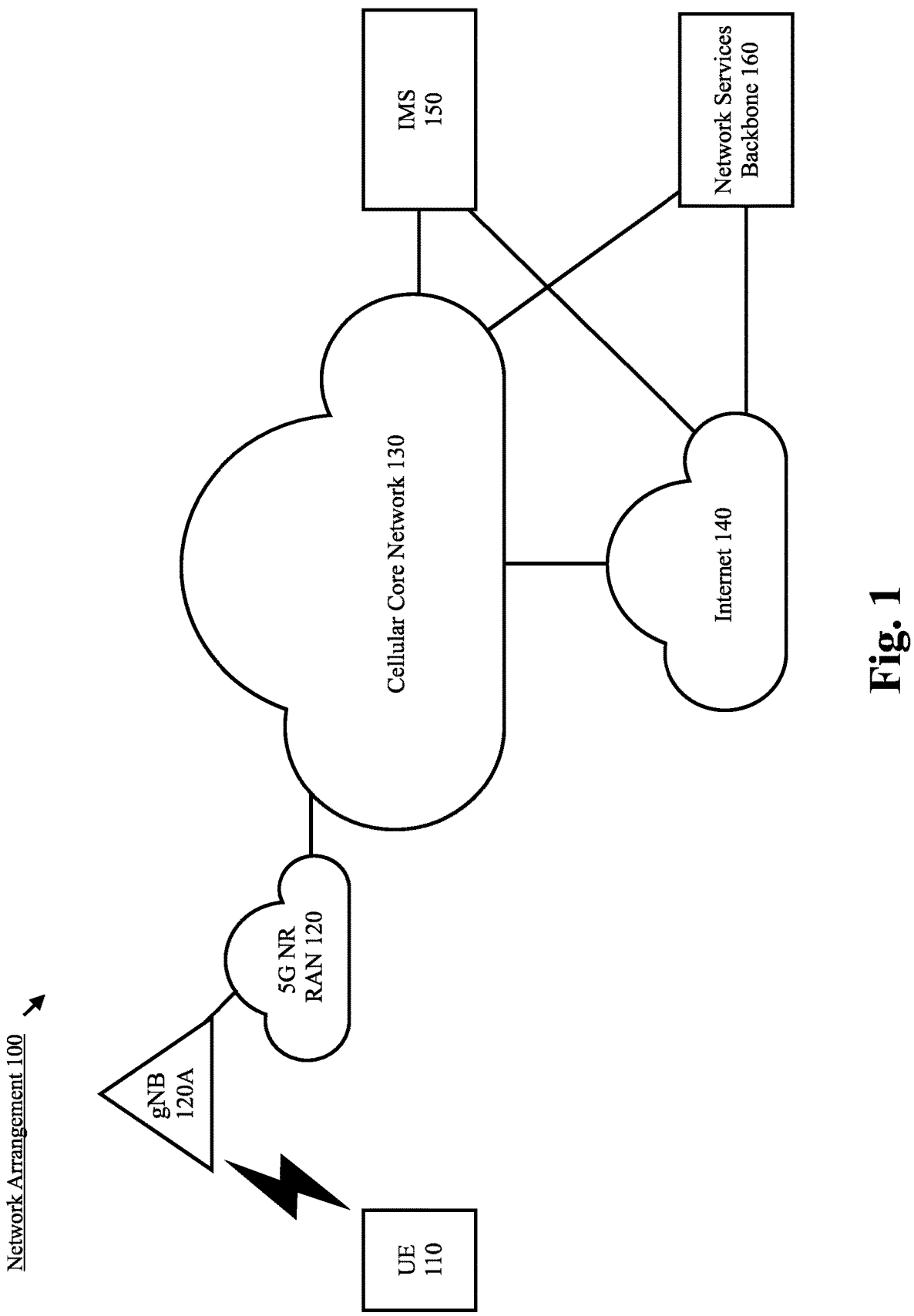
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to implementing system information block (SIB) segmentation. As will be described in more detail below, SIB segmentation may include segmenting a SIB into multiple segments and transmitting each segment in a different container. The exemplary embodiments include techniques that may be utilized on the user equipment (UE) side and the network side. These exemplary techniques may allow certain types of information to be included in a SIB regardless of the maximum SIB size limit imposed by the network and/or the physical layer.

The exemplary embodiments are described with regard to a UE. However, reference to the term UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments are also described with regard to a 5G NR network that supports SIB segmentation. Those skilled in the art will understand that there are various different types of SIBs defined throughout third generation partnership (3GPP) Specifications. Each type of SIB may be configured to carry a certain type of information and be provided to the UE under certain conditions. However, throughout this description, any reference to a particular type of SIB is merely provided for illustrative purposes. Those skilled in the art will understand that the exemplary techniques described herein may be used in conjunction with currently implemented SIBs or future implementations of SIBs.

A network may impose a maximum SIB size limit. For example, due to physical layer restrictions or any other appropriate factor, there may be a maximum SIB size limit of (L) bits. Under conventional circumstances, the maximum SIB size limit may prevent currently implemented SIBs from being configured to include unconventional/new types of information and may hinder the introduction of a new type of SIB. Accordingly, the maximum SIB size limit is an aspect of SIB design that may prevent SIBs from being utilized by the network to provide certain types of information to UEs.

The exemplary embodiments are described with regard to implementing a "SIB-X" that is configured to carry configuration information corresponding to tracking reference signal (TRS) and channel state information (CSI)-reference signal (CSI-RS). As will be described in more detail below, TRS and CSI-RS configuration information may be beam specific and there may be up to 64 (or more) beams to consider. As a result, the size of the configuration information (N) may exceed the maximum SIB size limit (L). Those skilled in the art will understand that SIBs are typically identified using numbers and/or letters, e.g., SIB1, SIB2, SIBpos, etc. The notation SIB-X is being used herein to refer to a SIB that has the characteristics as described above that has yet to be identified by a number and/or letter. The exemplary embodiments are described as providing various manners of signaling a SIB having the characteristics of the exemplary SIB-X. However, it should be understood that the exemplary embodiments may be applicable to any SIB (currently defined and/or future implementation (e.g., SIB-X) where the contents of the SIB exceed the maximum SIB size limit.

While the exemplary embodiments may provide benefits to the above referenced concepts of SIB-X, TRS configuration information and CSI-RS configuration, the exemplary embodiments are not limited to these concepts. Throughout this description, any reference to SIB-X, TRS configuration information and CSI-RS configuration is provided as an example. Those skilled in the art will understand that the exemplary SIB segmentation techniques described herein may be utilized in conjunction with currently implemented SIBs or future implementations of SIBs.

In one aspect, the exemplary embodiments include techniques for implementing "soft segmentation." Throughout this description, the term soft segmentation generally refers to a concept in which a SIB (e.g., SIB-X, etc.) is configured into multiple individual segments and each individual segment may be decoded without the other segments. To provide a general example, the base station may broadcast three individual SIB-X segments and the UE may decode the contents of any one of the three individual SIB-X segments regardless of whether the UE has acquired the other two individual SIB-X segments.

In another aspect, the exemplary embodiments include techniques for implementing "hard segmentation." Throughout this description, the term hard segmentation generally refers to a concept in which a SIB (e.g., SIB-X, etc.) is configured into multiple individual segments and the UE utilizes the complete set of SIB segments to decode the SIB. To provide a general example, the base station may broadcast three individual SIB-X segments. The UE may receive all three SIB segments, assemble the contents of the three SIB segments and then decode the contents of the SIB. Each of these exemplary concepts will be described in more detail below.

FIG. 1 shows an exemplary network arrangement 100 according to various exemplary embodiments. The exemplary network arrangement 100 includes the UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the 5G NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

The gNB 120A may include one or more communication interfaces to exchange data and/or information with camped UEs, the 5G NR RAN 120, the cellular core network 130, the internet 140, etc. Further, the gNB 120A may include a processor configured to perform various operations. For example, the processor may be configured to perform operations related to generating a SIB (e.g., SIB-X, etc.), generating multiple individual SIB segments from the SIB and transmitting the individual SIB segments. However, reference to a processor is merely for illustrative purposes. The operations of the gNB 120A may also be represented as a separate incorporated component of the gNB or may be a modular component coupled to the node, e.g., an integrated circuit with or without firmware. For example, the integrated circuit may include input circuitry to receive signals and processing circuitry to process the signals and other information. In addition, in some gNBs, the functionality of the processor is split among two or more processors such as a baseband processor and an applications processor. The exemplary embodiments may be implemented in any of these or other configurations of a base station or cell.

Any suitable association procedure may be performed for the UE 110 to connect to the 5G NR PAN 120. For example, as discussed above, the 5G NR PAN 120 may be associated with a particular cellular provider where the UE 110 and/or the user thereof has a contract and credential information (e.g., stored on a SIM card). Upon detecting the presence of the 5G NR PAN 120, the UE 110 may transmit the corresponding credential information to associate with the 5G NR PAN 120. More specifically, the UE 110 may associate with a specific cell or base station (e.g., gNB 120A). As mentioned above, the use of the 5G NR PAN 120 is for illustrative purposes and any appropriate type of PAN may be used.

In addition to the 5G NR PAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the EPC and/or the 5GC. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
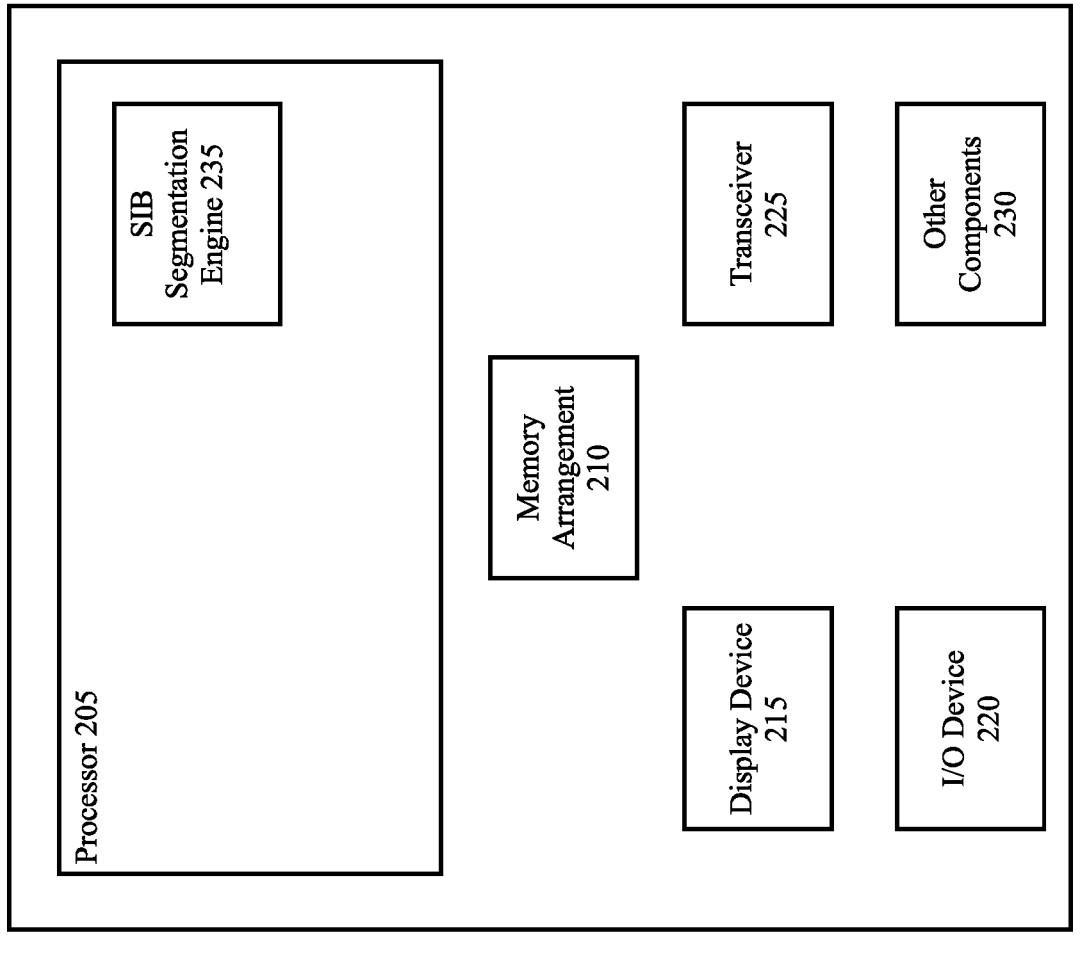
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a SIB segmentation engine 235. The SIB segmentation engine 235 may perform various operations related to receiving and decoding individual SIB segments. In some exemplary embodiments, this may include individually decoding each SIB segment. In other exemplary embodiments, this may include assembling the individual SIB segments and then decoding the contents of the SIB.

The above referenced engine 235 being an application (e.g., a program) executed by the processor 205 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

The exemplary embodiments include two types of SIB segmentation approaches, soft segmentation and hard segmentation. A general overview of soft segmentation and hard segmentation is provided below with regard to the signaling diagram 300. Subsequently, additional details for the soft segmentation approach is provided below with regard to FIGS. 4-5 and additional details for the hard segmentation approach is provided below with regard to FIGS. 6-9.

Figure 3:
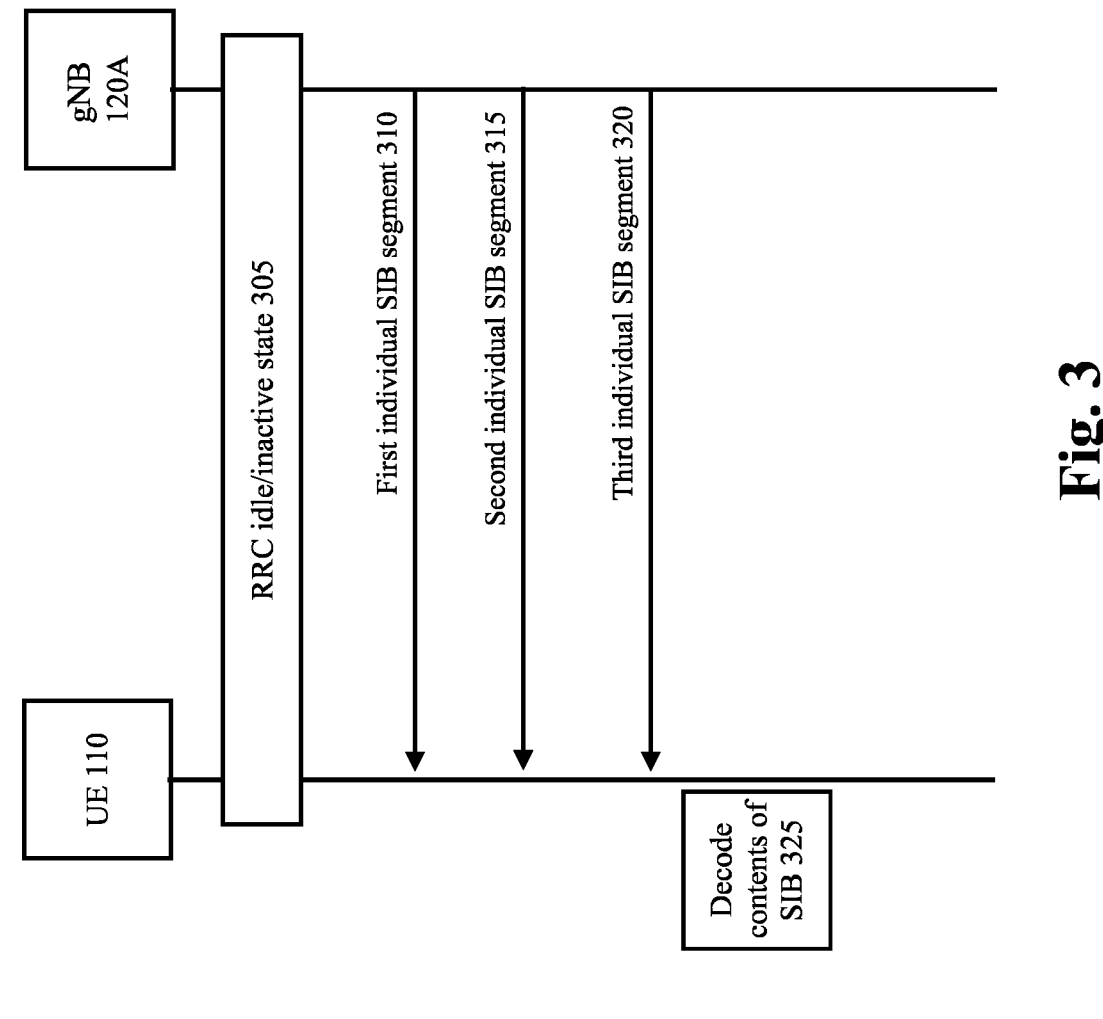
FIG. 3 shows a signaling diagram for system information block (SIB) segmentation according to various exemplary embodiments.

FIG. 3 shows a signaling diagram 300 for SIB segmentation according to various exemplary embodiments. The signaling diagram 300 will be described with regard to the network arrangement 100 of FIG. 1 and the UE 110 of FIG. 2. The signaling diagram 300 is provided as a general overview of SIB segmentation and is not intended to limit the exemplary embodiments in any way.

The signaling diagram 300 includes the UE 110 and the gNB 120A of the 5G NR 120. In 305, the UE 110 camps on the gNB 120A in an RRC idle state or an RRC inactive state. For example, the UE 110 may tune its transceiver 225 to various frequencies to listen for information broadcast by network nodes (e.g., the gNB 120A, etc.).

In 310-320, the gNB 120A transmits a first, second and third individual SIB segment. In 325, the UE 110 decodes the contents of one or more SIB segments. As a result, the configuration information signaled via the SIB segments may be available at the UE 110 for subsequent operations.

In a soft segmentation scheme, the UE 110 may decode each of the individual SIB segments on their own. For example, each individual SIB segment may be self abstract syntax notation one (ASN.1) decodable. On the network side, when implementing soft segmentation, the maximum SIB message size limit (L) may be considered before constructing each individual segment and consistent ASN.1 encoding techniques may be used for each individual segment. On the UE 110 side, since each individual SIB segment may be decoded on its own, the UE 110 may selectively acquire individual segments and apply the corresponding configuration information as soon as it is available (e.g., processed, decoded, etc.) for subsequent operations. Accordingly, in this example, configuration information included in first SIB segment 310 may be available for subsequent operations at the UE 110 before the configuration information of the second and/or third segments 315, 320 is acquired.

In a hard segmentation scheme, the UE 110 may be configured to assemble multiple SIB segments before decoding the contents of the SIB segments. In other words, each individual SIB segment may not be self ASN.1 decodable. On the network side, hard segmentation may include encoding the SIB and then dividing the SIB into multiple individual segments. On the UE 110 side, since each individual SIB segment may not be decoded on its own, the UE 110 may have to receive multiple SIB segments (e.g., the complete set 310-330, or a subset) before decoding is performed.

As mentioned above, SIB segmentation may enable a network to utilize a SIB to provide information to the UE 110 that may exceed the maximum SIB size limit (e.g., (L) bits or bytes). The following description of SIB-X, TRS and CSI-RS is provided as an example of why the maximum SIB size limit may hinder the network from providing certain types of information via a SIB. While the exemplary embodiments may provide benefits for SIB-X signaling, the exemplary embodiments are not limited to SIB-X, TRS or CSI-RS. Those skilled in the art will understand that that the exemplary techniques described herein may be utilized in conjunction with any appropriate currently implemented SIB configuration or any appropriate future implementation of a SIB configuration.

In NR, discontinuous reception (DRX) and connected mode DRX (CDRX) may be supported. For example, when the UE 110 is in the radio resource control (RRC) connected state, the UE 110 may be configured with a CDRX cycle that includes an onDuration during which the UE 110 may monitor the PDCCH for data scheduling information. When the UE 110 is in the RRC idle state or the RRC inactive state, the UE 110 may be configured with a DRX cycle that includes an onDuration during which the UE 110 may monitor for downlink control information (DCI) during paging opportunities.

When a UE 110 sleeps for a relatively long duration during DRX or CDRX operations, a timing and frequency (T/F) error may occur when the UE 110 wakes up. The T/F offset may have a negative impact on the UE 110 decoding performance. In addition, the 'always on' signal used in LTE, e.g. the cell-specific reference signal (CRS), may not be supported in NR, which introduces further challenges for T/F estimation.

A TRS may be used to assist the UE 110 in T/F error estimation. TRS design is similar to CRS design. However, a TRS may not be assigned to the UE 110 when the UE 110 is in the RRC idle state or the RRC inactive state. CSI-RS may also be used to assist in T/F tracking. Before DRX wakeup, the UE 110 may perform pre-processing for T/F tracking. If a reference signal is not provided before DRX wake up, it may lead to a significant increase in UE 110 power consumption.

Enhanced NR UE power saving objectives have been defined for 3GPP R17. One objective for enhanced NR UE power saving includes enhancements for idle/inactive-state UE power saving. This includes specifying means to provide TRS/CSI-RS occasion(s) typically available in connected mode to idle/inactive-mode UEs.

As indicated above, the UE 110 may use TRS/CSI-RS for T/F tracking. The TRS/CSI-RS configuration is assigned to the UE 110 in the RRC connected state and can be shared across multiple UEs. Thus, the network may utilize the same TRS/CSI-RS configuration across multiple UEs within the same cell. The gNB 120A may schedule its resources to signal the TRS/CSI-RS configuration based on its internal implementation, and can potentially turn off the TRS/CSI-RS in some cases (e.g. when no further connected state UEs are in the current cell). NR UEs in the idle/inactive state typically acquire the synchronization signal block (SSB) prior to a paging decode occasion for T/F tracking, as there is no cell specific reference signal (CRS) in NR. The UE 110 may reuse a TRS/CSI-RS to minimize SSB decoding prior to a paging decode, resulting in enhanced power saving.

RAN working groups (WG) have imposed some limitations for the TRS/CSI-RS design in 5G NR. In one design objective, it was determined that no new type(s) of TRS/CSI-RS are to be introduced specifically for idle/inactive state UEs. In another design objective, it was determined that TRS/CSI-RS for idle/inactive state UEs are to be shared with connected state UEs being served by the same gNB. In a third design objective, it was determined that RRM functionality for neighbor cells is not supported for TRS/CSI-RS for idle/inactive state UEs. In a fourth design objective, aperiodic TRS or semi-persistent/aperiodic CSI-RS are not to be used as TRS/CSI-RS occasions for idle/inactive state UEs.

To meet the various design objectives discussed above and provide enhanced power saving for idle/inactive UEs, a new SIB may be implemented, e.g., SIB-X. Those skilled in the art will understand that SIB-X is specific for signaling TRS/CSI-RS configuration information and may be received by the UE 110 when the UE 110 is in the RRC idle state or the RRC inactive state. The SIB-X does not impact existing non-R17 UEs, which do not need this additional information. In addition, SIB-X may be configured as on-demand system information (ODSI) (not part of MIB/SIB1) to reduce the overall system signaling load. That is, only R17 power saving-capable UEs would request this on-demand, and non-R17 UEs would not request or receive this information.

TRS/CSI-RS configuration information may be beam specific. In some instances, there may be up to 64 (or more) beams to consider. While SIB-X does not have any specific size restrictions with regard to the number of TRS/CSI-RS configurations that can be provided to the idle/inactive UEs via a SIB-X, a maximum SIB size limit may be imposed by the network and/or the physical layer. It has been identified that the size of the TRS/CSI configuration information (N bits) may exceed the maximum SIB size limit (L bits). The exemplary SIB segmentation techniques described herein may enable SIB-X or any other type of SIB to be utilized even when the contents of the SIB exceed the maximum SIB size limit.

Figure 4:
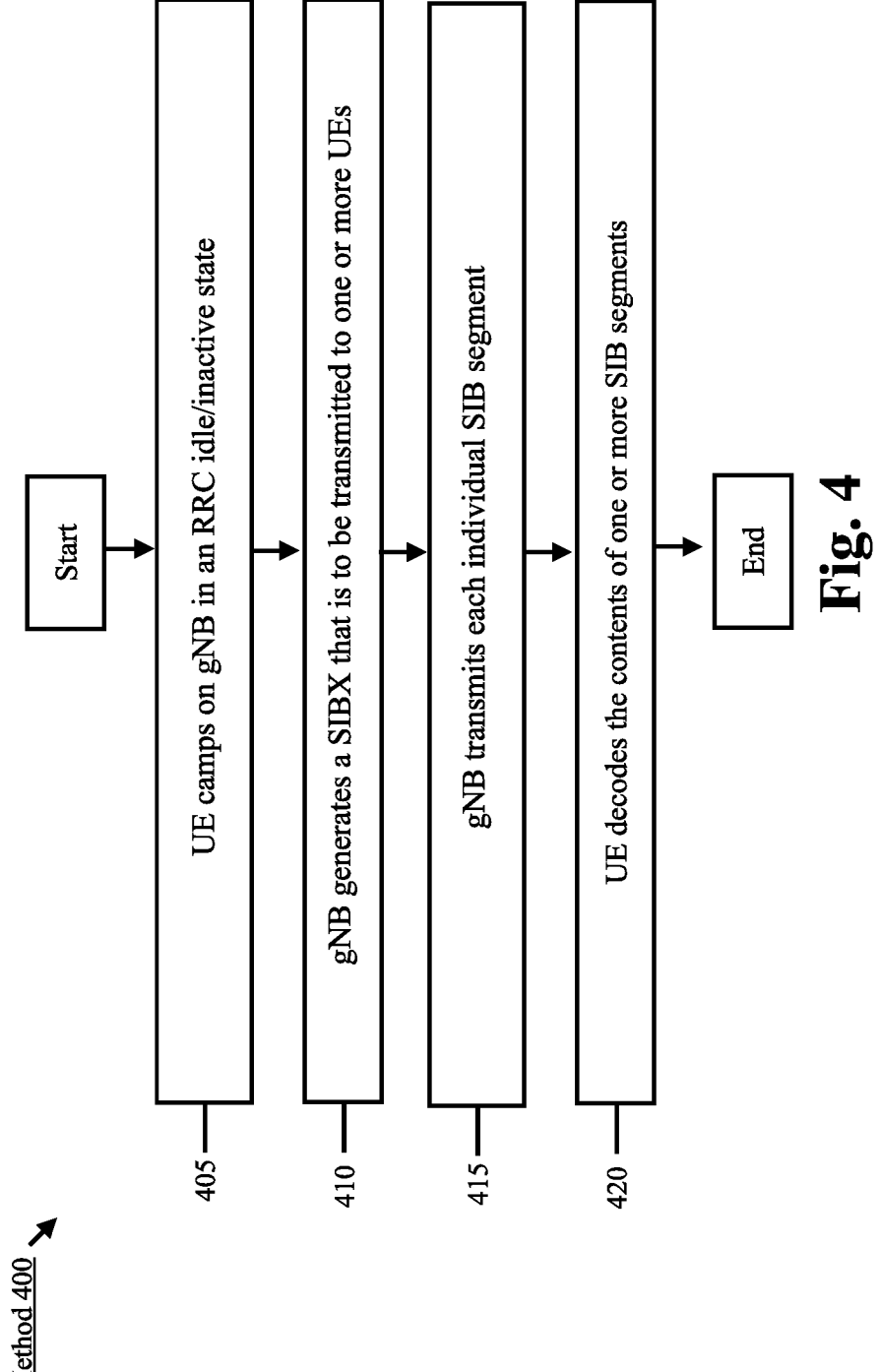
FIG. 4 shows a method for a soft segmentation scheme according to various exemplary embodiments.

FIG. 4 shows a method 400 for a soft segmentation scheme according to various exemplary embodiments. The method 400 will be described with regard to the network arrangement 100 of FIG. 1 and the UE 110 of FIG. 2. The method 400 is described with regard to the gNB 120A providing a SIB-X to the UE 110. However, as indicated above, the exemplary soft segmentation scheme described herein is not limited to a SIB-X and may be applicable to any appropriate currently implemented SIB or any appropriate future implementation of a SIB.

In 405, the UE 110 is camped on the gNB 120A in the RRC idle state or the RRC inactive state.

In 410, the gNB 120A generates a SIB-X that is to be broadcast to one or more UEs. In accordance with the soft segmentation scheme, each individual SIB segment may be self ASN.1 decodable. Thus, in this example, generating the SIB-X may include encoding multiple SIB-X segments. Each SIB-X segment may be constructed such that it does not exceed the maximum SIB size limit. However, the cumulative size of two or more of the SIB-X segments may exceed the maximum SIB size limit.

In 415, the gNB 120A transmits each individual SIB segment. Throughout this description, any reference to a SIB being configured as a particular number of SIB segments is merely provided for illustrative purposes, the exemplary embodiments are not limited to any particular number of SIB segments.

In some exemplary embodiments, the SIB-X may be an on-demand SIB. Thus, prior to 410 and/or 415, the UE 110 may transmit a request to the network for the SIB-X.

The operation of generating the SIB-X (410) and transmitting the SIB segments (415) may overlap in time. Since each SIB-X segment may be self-decodable at the UE 110, the gNB 120A does not need to wait to encode the entirety of the SIB-X before transmitting SIB-X segments. Thus, in some exemplary embodiments, a first SIB-X segment may be generated (e.g., encoded, etc.) and transmitted before (or during) the construction of a second SIB-X segment.

In 420, the UE 110 may decode the contents of one or more SIB segments. Since each SIB-X segment may be self-decodable, the UE 110 may selectively acquire individual SIB segments. For example, the UE 110 may identify that a particular SIB-X segment is irrelevant to the UE 110. Accordingly, in some exemplary embodiments, the UE 110 may omit receiving, processing, decoding and/or retaining the contents of one or more SIB-X segments. Similarly, in other exemplary embodiments, the UE 110 may decide to discard a particular SIB segment. In addition to selectively acquiring individual SIB segments, the UE 110 apply the configuration information received in an individual SIB segment as soon as the configuration information is available at the UE 110, e.g., decoded, processed, etc.

Although not shown in the method 400, in some exemplary embodiments, the network may indicate that there has been a change to the contents of SIB-X. To provide an example, a SIB modification procedure may be used to indicate to UEs that SIB-X has changed. In some exemplary embodiments, this indication may be provided via an information element (IE) included in a short message. For example, a value of a short message SystemInfoModification IE bit (e.g., 0, 1, etc.) may indicate to the UE 110 that the contents of the SIB-X have changed.

In some exemplary embodiments, the network may indicate which SIB segment has been modified. This may enable UEs to selectively acquire only the modified SIB segments and thus, may result in faster SIB acquisition of the modified SIB segments. From a signaling perspective, this feature may be achieved by configuring the SIB-Typeinfo in system information (SI)-SchedulingInfo of SIB1 to include a bitmap that indicates the set of segments of the SIB-X that has been modified. The modified segment information may be indicated as an integer value with a (X) bit number assuming a maximum of (X) segments. The UE 110 may interpret this as a bitmap with one bit corresponding to each segment.

FIG. 5 shows an example of an ASN.1 500 that may be utilized to indicate a modified SIB segment. In this example, the SIB-typeinfo of a SIB1 is configured to indicate that one or more segments of SIB-X have been modified. To provide an example, if the field modifiedSigInd is set to a first value (e.g., 0), this may indicate that the SIB-X is not segmented. If the field modifiedSigInd is set to a second value (e.g., (Y) between 0 and 65535) this may indicate that (Y) SIB-X segments have been modified. If the field modifiedSigInd is set to a third value (e.g., 65535), this may indicate that all of the SIB-X segments have been modified.

Figure 6:
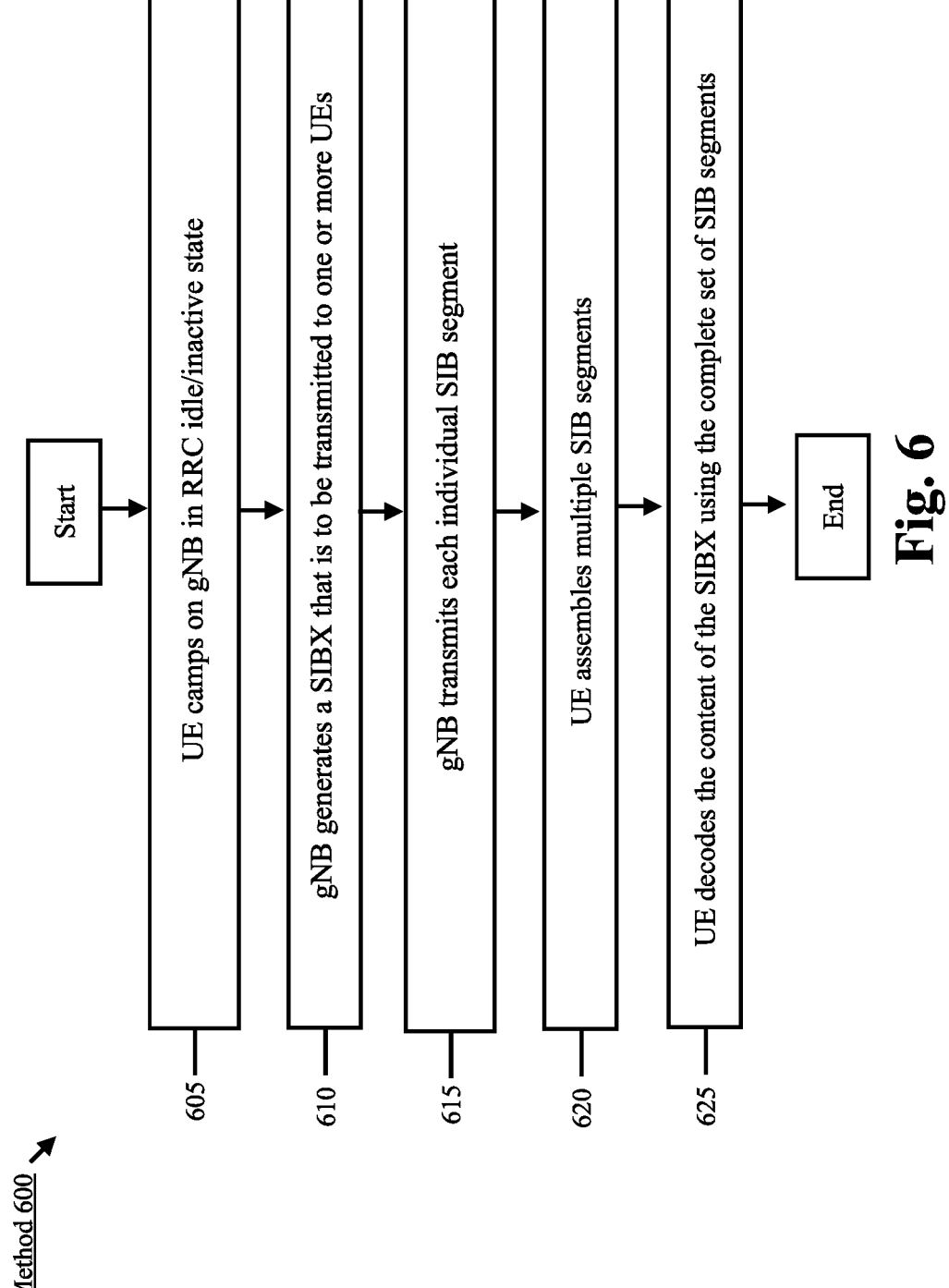
FIG. 6 shows a method for a hard segmentation scheme according to various exemplary embodiments.

FIG. 6 shows a method 600 for a hard segmentation scheme according to various exemplary embodiments. The method 600 will be described with regard to the network arrangement 100 of FIG. 1 and the UE 110 of FIG. 2. The method 600 is described with regard to the gNB 120A providing a SIB-X to the UE 110. However, as indicated above, the exemplary hard segmentation scheme described herein is not limited to a SIB-X and may be applicable to any appropriate currently implemented SIB or any appropriate future implementation of a SIB.

In 605, the UE 110 is camped on the gNB 120A in the RRC idle state or the RRC inactive state.

In 610, the gNB 120A generates a SIB-X that is to be broadcast to one or more UEs. In accordance with the hard segmentation scheme, each SIB segment is not self ASN.1 decodable. Therefore, in contrast to the soft segmentation scheme, generating the SIB-X may include assembling the complete encoded message and then partitioning the SIB-X into multiple SIB segments. Each SIB-X segment may be constructed such that it does not exceed the maximum SIB size limit. However, the cumulative size of two or more of the SIB-X segments may exceed the maximum SIB size limit.

In 615, the gNB 120A transmits each individual SIB segment. Throughout this description, any reference to a SIB being configured as a particular number of SIB segments is merely provided for illustrative purposes, the exemplary embodiments are not limited to any particular number of SIB segments.

In some exemplary embodiments, the SIB-X may be an on-demand SIB. Thus, prior to 610 and/or 615, the UE 110 may transmit a request to the network for the SIB-X.

In 620, the UE 110 assembles the multiple SIB segments. Together, the contents of the multiple SIB segments comprise the same contents as the complete encoded message referenced in 610. In 625, the UE 110 decodes the content of the SIB-X using the complete set of SIB segments.

There are benefits to both the soft segmentation and the hard segmentation schemes described herein. Generally, implementation of the soft segmentation scheme is more complex on the network side and the implementation of the hard segmentation scheme is more complex on the UE 110 side. Regarding the soft segmentation scheme, since each SIB segment may be self-decodable, the UE 110 may apply certain configuration information faster because the UE 110 does not have to wait to receive a further SIB segment to perform decoding on a previously received SIB segment. In addition, the soft segmentation scheme enables the UE 110 to selectively acquire certain SIB segments. This feature may provide a benefit for SIB modification procedures, UE power saving and UE performance.

The hard segmentation scheme allows for a SIB segmentation framework that may be more easily incorporated into multiple use cases as the system information content is carried in a relatively more generic container, e.g., TRS/CSI-RS enhanced power saving use case, RAN slicing to carry slice specific broadcast information use case. In other words, while it is possible to utilize either the soft segmentation scheme or the hard segmentation scheme for these types of use cases, it may require less complexity to configure the hard segmentation scheme for these types of use cases.

Figure 7:
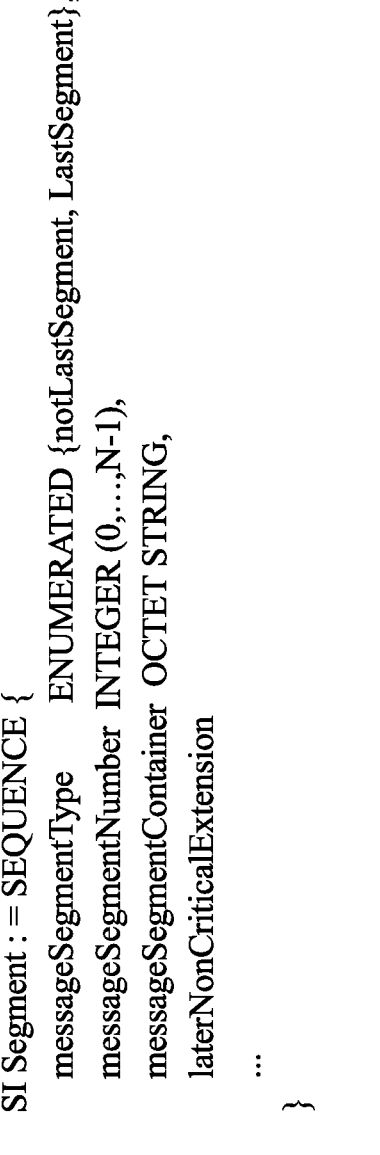
FIG. 7 shows an example of a SIB segment container according to various exemplary embodiments.

FIG. 7 shows an example of a SIB segment container 700 according to various exemplary embodiments. This SIB segment container will be described with regard to the hard segmentation scheme.

The SIB segment container 700 may include a field that indicates whether this SIB segment is the last SIB segment of the SIB-X. In this example, the field is referred to as the "messageSegmentType" field and may indicate "notLast-Segment" or "LastSegment." In addition, the SIB container 700 may include a field that indicates the current segment number for each segmented system information instances. For example, the SIB segment container may include an integer value between 0 and N–1 where N is the total number of SIB segments.

In addition, the network may encode an OCTET string, associated with one segment instance of the segmented system information. The UE 110 may perform the decoding of the SIB-X using the OCTET string from each SIB segment. To provide an example, the OCTET string may be interpreted as a sequence of bits. When the complete set of SIB-X segments is reassembled to get the full sequence, the reassembled sequence of bits may be ASN.1 decoded. As part of this decoding, the UE 110 may be identify the current SIB-X based on SIB type information encoded as part of the OCTET string.

Figure 8:
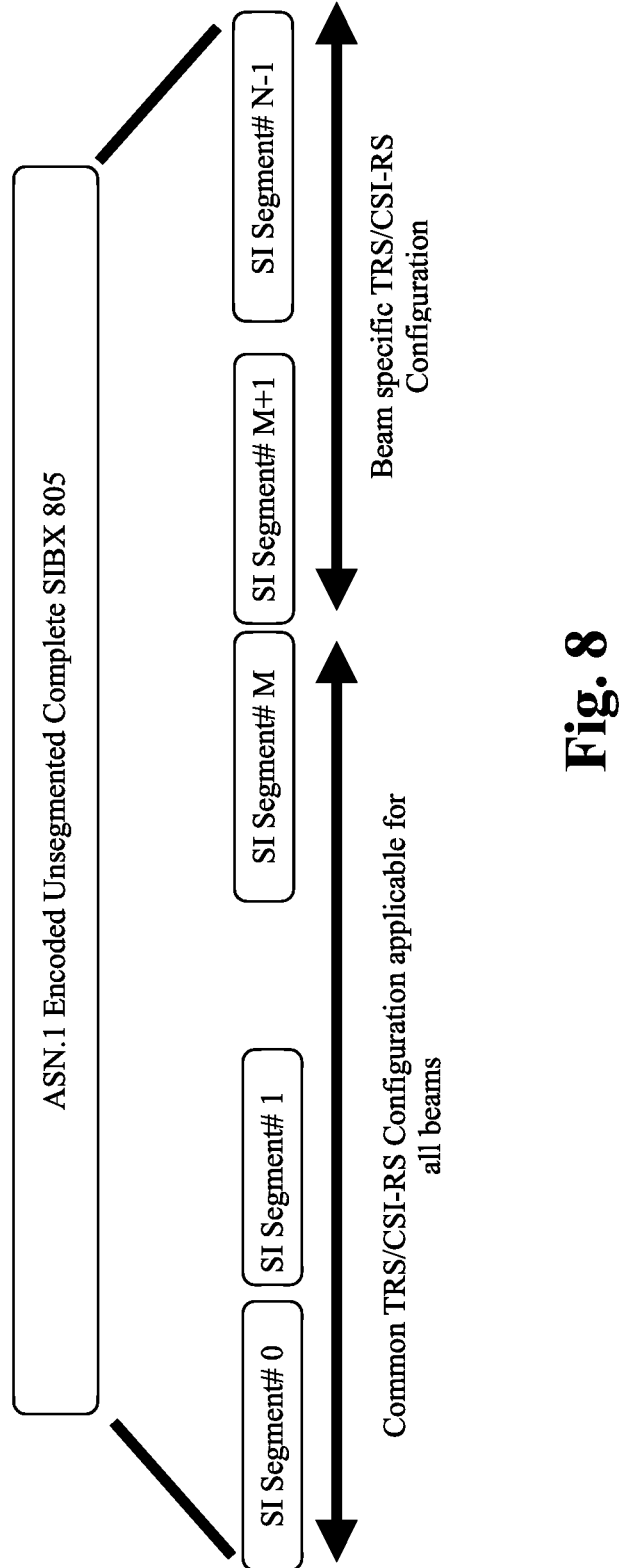
FIG. 8 illustrates a design for SIB-X in accordance with the exemplary hard segmentation scheme described herein.

FIG. 8 illustrates a design for SIB-X in accordance with the exemplary hard segmentation scheme described herein. FIG. 8 shows an ASN.1 encoded unsegmented complete SIB-X 805. As mentioned above, when using the hard segmentation scheme, the network may first encode the complete SIB message.

The SIB-X 805 may be configured into multiple SIB segments. Each SIB segment may be equal to or less than a maximum SIB size limit. However, the size of the SIB-X

805 and the cumulative size of one or more SIB-X segments may exceed the maximum SIB size limit.

The network may configure the common aspects of TRS/CSI-RS signaling in a first subset of one or more SIB segments (M) for a set of SIB segments (0 to N−1). These common aspects may include configuration information that is applicable to all the beams configured for TRS/CSI-RS. In this example, the common configuration information is shown as being included in SI segment #0, SI segment #1 to SI segment #M. In addition, the network may configure the beam specific configuration information in a second subset of one or more SIB segments. Thus, configuration information included in a SIB segment of the second subset is specific to one or more beams (but not all beams) configured for TRS/CSI-RS. In this example, the beam specific configuration information is shown as being included in SI segment #M+1 and SI segment #N−1.

Figure 9:
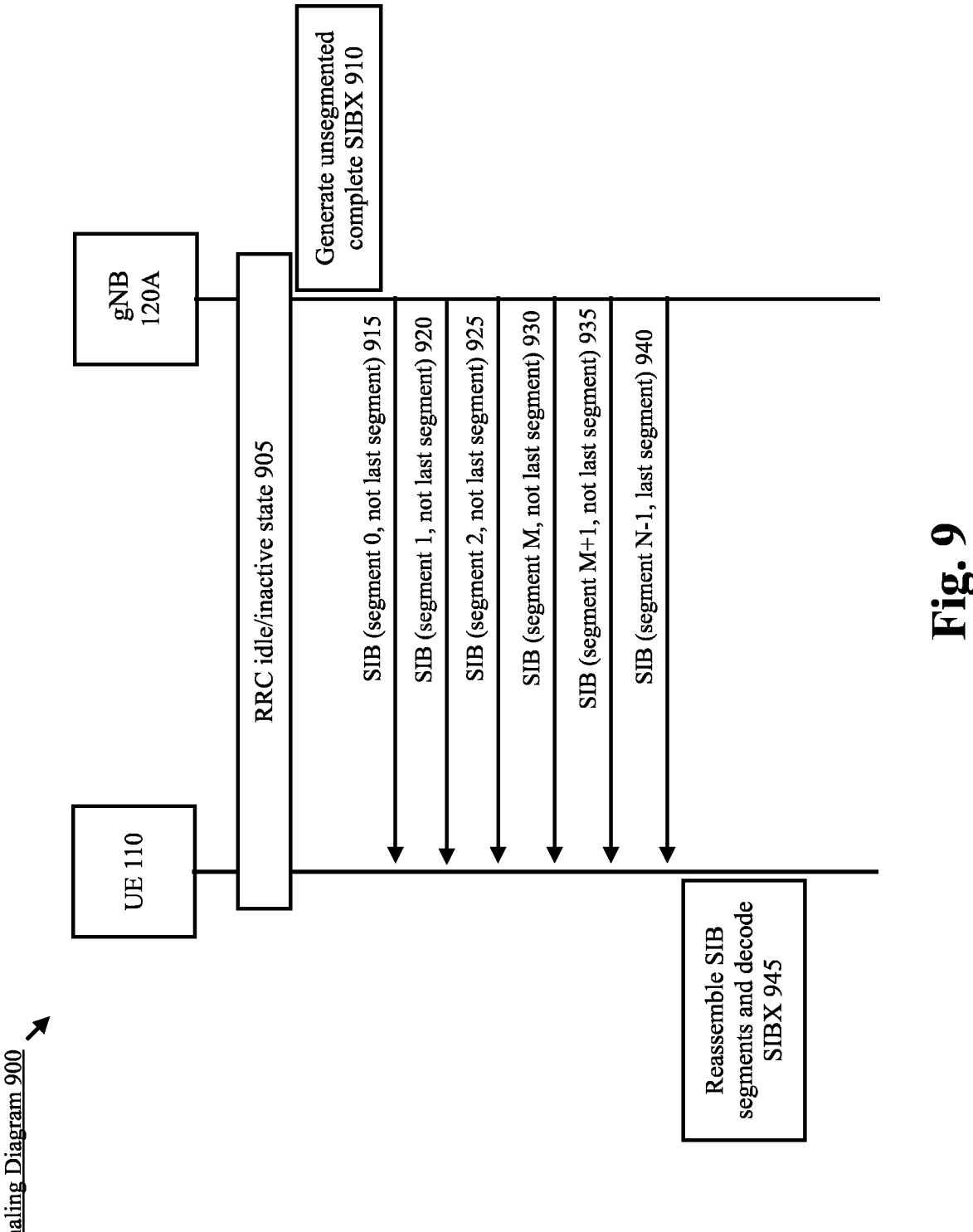
FIG. 9 shows a signaling diagram for implementing a hard segmentation scheme for SIB-X according to various exemplary embodiments.

FIG. 9 shows a signaling diagram 900 for implementing a hard segmentation scheme for SIB-X according to various exemplary embodiments. The signaling diagram 900 will be described with regard to the network arrangement 100 of FIG. 1, the UE 110 of FIG. 2, the message container 700 of FIG. 7 and the segment configuration illustrated in FIG. 8.

The signaling diagram 900 includes the UE 110 and the gNB 120A. In 905, the UE 110 is camped on the gNB 120A in the RRC idle state or the RRC inactive state.

In 910, the gNB 120A generates an ASN.1 encoded unsegmented complete SIB-X 805. In each of 915-930, the gNB 120A transmits an individual SIB segment. Each individual SIB segment is derived from the SIB-X 805. In this example, the SIB segment transmitted in 915 includes an indication that this system information is a first segment of the SIB-X 805 (e.g., segment 0) and an indication that this segment is not the last segment of the SIB-X 805. The SIB segment transmitted in 920 includes an indication that this system information is a second segment of the SIB-X 805 (e.g., segment 1) and an indication that this segment is not the last segment of the SIB-X 805. The SIB segment transmitted in 925 includes an indication that this system information is a third segment of the SIB-X 805 (e.g., segment 2) and an indication that this segment is not the last segment of the SIB-X 805. The SIB segment transmitted in 915 includes an indication that this system information is an M segment of the SIB-X 805 (e.g., segment M) and an indication that this segment is not the last segment of the SIB-X 805. As indicated above, common configuration information for TRS/CSI-RS is included my BE segment 0 to segment M.

In each of 935-940, the gNB 120A transmits an individual SIB segment. In this example, the SIB segment transmitted in 935 includes an indication that this system information is an M+1 segment of the SIB-X 805 (e.g., segment M+1) and an indication that this segment is not the last segment of the SIB-X 805. The SIB segment transmitted in 940 includes an indication that this system information is the last segment of the SIB-X 805 (e.g., segment N−1) and an explicit indication that this segment is the last segment of the SIB-X 805. As indicated above, beam specific configuration information for TRS/CSI-RS may be included in segment M+1 to segment N−1.

In 945, the UE 110 reassembles all the SIB segments (e.g., SI segment 0 to SI segment N−1) of the SIB-X and then decodes the contents of the SIB-X.

As indicated above, the exemplary embodiments may apply to an on demand SIB (e.g., SIB-X, etc.). In addition, the network may indicate if a particular SIB segment has been modified. Together, these features may enable the UE 110 to request specific SIB segments.

The following exemplary embodiments may be utilized in accordance with either the soft segmentation scheme or the hard segmentation scheme described herein. During operation, the network may indicate to the UE 110 that a SIB has been modified (e.g., ASN.1 500). If the indication is associated with one or more SIB segments that include common configuration information and no SIB segments that include beam specific configuration information (e.g., SIB segments 0 to M), the UE 110 may transmit an on demand request to the network for only the SIB segments that include common configuration information or only the SIB segments that have been modified. In this example, the UE 110 may reuse the beam specific configuration information that was previously received.

Similarly, if the network indicates to the UE 110 that one or more SIB segments that include beam specific configuration information has changed, the UE 110 may transmit an on demand request to the network for only the SIB segments that include beam specific configuration information or only the SIB segments that have been modified. In this example, the UE 110 may reuse the common configuration information that was previously received.

The SIB-X may include beam specific configuration information for multiple different beams (e.g., up to 64 or more beams). During operation, all of the different available beams may not be relevant to the UE 110 deployment scenario. Thus, in some embodiments, if the UE 110 is aware of a change to beam specific configuration information, the UE 110 may transmit an on demand SIB request corresponding to a specific subset of beams that are relevant to the UE 110. The UE 110 only has to acquire a subset of SIB segments associated with the specific subset of beams that are relevant to the UE 110. Since the other beams are not relevant to the UE 110, it is unnecessary for the UE 110 to acquire all of SIB segments containing beam specific configuration information. In addition, the UE 110 may reuse the common configuration information that was previously received.

To provide an example, the UE 110 may only be interested in 5 beams out of a total possible 64 beams. If the UE 110 receives an indication of a modification to beam specific configuration information, the UE 110 may transmit an on demand system information request indicating via a bitmap the set of 5 beams for which the UE 110 is requesting the SIB-X. On the network side, the network may only schedule the transmission of those segments of the SIB-X which carry the beam specific information corresponding to the 5 beams the UE 110 is interested in receiving.

Figure 10:
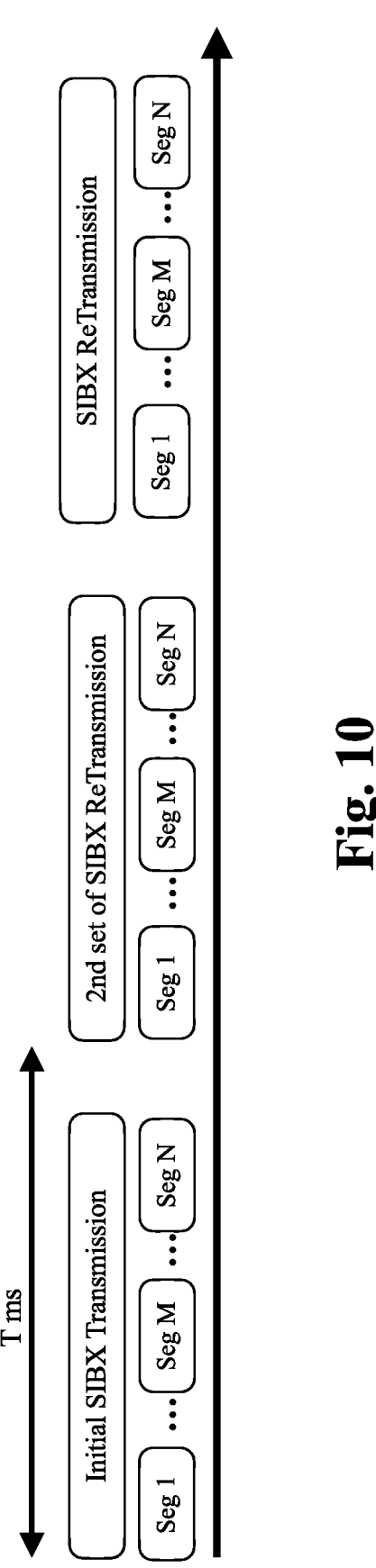
FIG. 10 illustrates an example of retransmitting a set of SIB segments.

When multiple SIB segments are transmitted, it may be possible that certain segments are missed by the UE 110. In addition, the UE 110 may not be configured to provide feedback to network regarding whether the UE 110 has successfully received all of the system information included in the SIB. In some embodiments, to ensure that the UE 110 successfully receives all of the SIB segments, the network may retransmit the requested SIB segments (N) times over a certain repetition period (T milliseconds (ms)). An example of retransmitting a set of SIB segments is shown in FIG. 10. In this example, N is equal to three. However, the exemplary embodiments are not limited to any particular retransmission configuration and may utilized with any appropriate values for T and N.

Examples

In a first example, a user equipment having a transceiver configured to communicate with a network and a processor communicatively coupled to the transceiver and configured to perform operations is provided. The operations include receiving a first signal, wherein the first signal includes a first individual system information block (SIB) segment of a SIB, receiving a second signal, wherein the second signal includes a second individual SIB segment of the SIB, reassembling the SIB using first SIB segment and the second SIB segment and decoding the contents of the SIB.

In a second example, the UE of the first example, wherein the first signal comprises a container including a segment number parameter and an octet string.

In a third example, the UE of the first example, wherein decoding the SIB is based on a first octet string included in the first signal and a second octet string included in the second signal.

In a fourth example, the UE of the first example, wherein the first signal comprises a container including an indication for whether the first SIB segment is the last SIB segment of the SIB.

In a fifth example, the UE of the first example, wherein individual SIB segments are not self abstract syntax notation one (ASN.1) decodable.

In a sixth example, the UE of the first example, wherein the first SIB segment includes configuration information corresponding to multiple beams and the second SIB segment includes configuration information for a specific beam.

In a seventh example, the UE of the first example, wherein the SIB includes configuration information comprising one of tracking reference signal (TRS) information and channel state information (CSI)-reference signal (CSI-RS) information.

In an eighth example, a base station having a transceiver configured to communicate with a user equipment and a processor communicatively coupled to the transceiver and configured to perform operations is provided. The operations include encoding an unsegmented complete system information block (SIB) that is to be transmitted to one or more user equipment (UE), partitioning the unsegmented complete SIB into multiple individual SIB segments, transmitting a first signal, wherein the first signal includes a first individual SIB segment and transmitting a second signal, wherein the second signal includes s second individual SIB segment and wherein the one or more UE is to reassemble the SIB segments prior to decoding the contents of the SIB.

In a ninth example, the base station of the eighth example, wherein the first signal comprises a container including a segment number parameter and an octet string.

In a tenth example, the base station of the eighth example, wherein the first signal comprises a container including an indication for whether the first SIB segment is the last SIB segment of the entire SIB.

In an eleventh example, the base station of the eighth example, wherein individual SIB segments are not self abstract syntax notation one (ASN.1) decodable at the one or more UE.

In a twelfth example, the base station of the eighth example, wherein the first SIB segment includes configuration information corresponding to multiple beams and the second SIB segment includes configuration information for a specific beam.

In a thirteenth example, the base station of the eighth example, wherein the first and second SIB segments are initially transmitted during a first repetition period and retransmitted during a second repetition period.

In a fourteenth example, the base station of the eighth example, wherein partitioning the unsegmented complete SIB into multiple individual SIB segments includes configuring a first subset of individual SIB segments and a second subset of individual SIB segments, wherein the first subset of individual SIB segments contains common configuration information for tracking reference signal (TRS) or channel state information (CSI)-reference signal (RS) and wherein the second subset of individual SIB segments contains beam specific configuration information for TRS and CSI-RS.

In a fifteenth example, a user equipment having a transceiver configured to communicate with a network and a processor communicatively coupled to the transceiver and configured to perform operations is provided. The operations include receiving a first signal, wherein the first signal includes a first individual system information block (SIB) segment of a SIB, receiving a second signal, wherein the second signal includes a second individual SIB segment of the SIB, receiving an indication that one or more of the SIB segments have been modified and transmitting an on demand system information request in response to the indication.

In a sixteenth example, the UE of the fifteenth example, wherein each SIB segment is self abstract syntax notation one (ASN.1) decodable.

In a seventeenth example, the UE of the fifteenth example, wherein the indication is included in a short message.

In a eighteenth example, the UE of the fifteenth example, wherein the indication identifies one or more SIB segments via a bitmap.

In a nineteenth example, the UE of the fifteenth example, wherein the on demand system information request comprises a bitmap identifying only a subset of multiple SIB segments.

In a twentieth example, a base station having a transceiver configured to communicate with a user equipment and a processor communicatively coupled to the transceiver and configured to perform operations is provided. The operations include transmitting a first signal, wherein the first signal includes a first individual system information block (SIB) segment of a SIB, transmitting a second signal, wherein the second signal includes a second individual SIB segment of the SIB, transmitting an indication that the SIB has been modified and receiving an on demand system information request from a user equipment (UE) in response to the indication.

In a twenty first example, the base station of the twentieth example, wherein the SIB is segmented into multiple individual SIB segments including a first subset of individual SIB segments and a second subset of individual SIB segments, wherein the first subset of individual SIB segments contains common configuration information for tracking reference signal (TRS) or channel state information (CSI)-reference signal (RS) and wherein the second subset of individual SIB segments contains beam specific configuration information for TRS and CSI-RS.

In a twenty second example, the base station of the twenty first example, wherein the base station is configured to transmit the first subset of individual SIB segments prior to the second subset of individual SIB segments.

In a twenty third example, the base station of the twentieth example, wherein the indication that the SIB has been modified includes a bitmap identifying one or more individual SIB segments.

In a twenty fourth example, the base station of the twentieth example, the operations further comprising transmitting one or more individual SIB segments to the UE in response to the request.

In a twenty fifth example, the base station of the twenty fourth example, wherein the request identifies the one or more individual SIB segments.

In a twenty sixth example, the base station of the twenty fourth example, wherein the request is for common configuration information and wherein the one or more individual SIB segments contain common configuration information and do not contain beam specific configuration information.

In a twenty seventh example, the base station of the twenty fourth example, wherein the request is for beam specific configuration information and wherein the one or more individual SIB segments contain beam specific configuration information and do not contain common configuration information.

In a twenty eighth example, the base station of the twenty fourth example, wherein the request is for beam specific configuration information and wherein the one or more individual SIB segments are a subset of the total number of individual SIB segments configured to carry the beam specific configuration information of the SIB.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
receiving a first signal from a base station, wherein the first signal includes a first system information block (SIB) segment of a SIB;
receiving a second signal from the base station, wherein the second signal includes a second SIB segment of the SIB and an indication that the SIB has been modified;
discarding the first SIB segment in response to the indication that the SIB has been modified;

receiving a third signal from the base station, wherein the third signal includes a third SIB segment of the SIB;
reassembling the SIB using at least the second and third SIB segments; and
decoding contents of the SIB, wherein the second SIB segment and the third SIB segment includes configuration information comprising tracking reference signal (TRS) information including first configuration information common to multiple beams in TRS resources and second configuration information for a specific beam in the TRS resources.

2. The processor of claim 1, wherein the first signal comprises a container including a segment number parameter and an octet string.

3. The processor of claim 1, wherein decoding the SIB is based on a first octet string included in the second signal and a second octet string included in the third signal.

4. The processor of claim 1, wherein the third signal comprises a container including an indication for whether the third SIB segment is a last SIB segment of the SIB.

5. The processor of claim 1, wherein individual SIB segments are not self abstract syntax notation one (ASN.1) decodable.

6. A processor of a base station configured to perform operations comprising:
encoding an unsegmented complete system information block (SIB) that is to be transmitted to one or more user equipment (UE);
partitioning the unsegmented complete SIB into multiple SIB segments;
transmitting a first signal, wherein the first signal includes a first SIB segment; and
transmitting a second signal, wherein the second signal includes a second SIB segment and an indication that the SIB has been modified, wherein the one or more UE discards the first SIB segment in response to the indication that the SIB has been modified;
transmitting a third signal, wherein the third signal includes a third SIB segment of the SIB, and wherein the one or more UE is to reassemble the multiple SIB segments prior to decoding contents of the SIB, wherein the second SIB segment and the third SIB segment includes configuration information comprising tracking reference signal (TRS) information including first configuration information common to multiple beams in TRS resources and second configuration information for a specific beam in the TRS resources.

7. The processor of claim 6, wherein the first signal comprises a container including a segment number parameter and an octet string.

8. The processor of claim 6, wherein the first signal comprises a container including an indication for whether the third SIB segment is a last SIB segment of an entirety of the SIB.

9. The processor of claim 6, wherein individual SIB segments are not self abstract syntax notation one (ASN.1) decodable at the one or more UE.

10. The processor of claim 6, wherein the first and second SIB segments are initially transmitted during a first repetition period and retransmitted during a second repetition period.

11. A user equipment (UE) comprising:
a transceiver configured to connected to a network; and
a processor configured to perform operations comprising:
receiving a first signal from a base station, wherein the first signal includes a first system information block (SIB) segment of a SIB;

receiving a second signal from the base station, wherein the second signal includes a second SIB segment of the SIB, wherein the SIB includes configuration information comprising tracking reference signal (TRS) information and an indication that the SIB has been modified;

discarding the first SIB segment in response to the indication that the SIB has been modified;

receiving a third signal from the base station, wherein the third signal includes a third SIB segment of the SIB;

reassembling the SIB using at least the second and third SIB segments; and decoding contents of the SIB, wherein the second SIB segment and the third SIB segment includes configuration information comprising tracking reference signal (TRS) information including first configuration information common to multiple beams in TRS resources and second configuration information for a specific beam in the TRS resources.

12. The processor of claim 11, wherein each SIB segment is self abstract syntax notation one (ASN.1) decodable.

13. The processor of claim 11, wherein the indication is included in a short message.

14. The processor of claim 11, wherein the indication identifies one or more SIB segments via a bitmap.

15. The processor of claim 11, wherein the processor is configured to perform further operations comprising:

transmitting an on demand system information request comprising a bitmap identifying only a subset of multiple SIB segments.

* * * * *